(12) United States Patent
Hirunuma et al.

(10) Patent No.: US 6,927,906 B2
(45) Date of Patent: Aug. 9, 2005

(54) BINOCULAR TELESCOPE WITH PHOTOGRAPHING FUNCTION

(75) Inventors: Ken Hirunuma, Tokyo (JP); Atsumi Kaneko, Tokyo (JP); Gouji Funatsu, Saitama (JP); Kiyoshi Kawano, Saitama (JP)

(73) Assignee: PENTAX Corporation, Tokyo (JP)

( * ) Notice: Subject to any disclaimer, the term of this patent is extended or adjusted under 35 U.S.C. 154(b) by 166 days.

(21) Appl. No.: 10/256,003

(22) Filed: Sep. 27, 2002

(65) Prior Publication Data

US 2003/0063380 A1 Apr. 3, 2003

(30) Foreign Application Priority Data

Sep. 28, 2001 (JP) ..................................... P2001-302629

(51) Int. Cl.⁷ ............................................. G02B 23/00
(52) U.S. Cl. ..................... 359/409; 359/407; 359/410
(58) Field of Search ................................ 359/407, 409, 359/482, 410, 411, 412, 417, 418, 400; D16/133

(56) References Cited

U.S. PATENT DOCUMENTS

| | | | | |
|---|---|---|---|---|
| 3,277,303 A | * | 10/1966 | Jensen et al. ................ | 398/132 |
| 4,067,027 A | | 1/1978 | Yamazaki .................... | 396/432 |
| 4,262,988 A | | 4/1981 | Ishibai et al. ............... | 359/418 |

(Continued)

FOREIGN PATENT DOCUMENTS

| | | |
|---|---|---|
| JP | 57-79909 | 5/1982 |
| JP | 62-96919 | 5/1987 |
| JP | 3-235491 | 10/1991 |
| JP | 3-242610 | 10/1991 |
| JP | 5-2132 | 1/1993 |
| JP | 6-2330 | 1/1994 |
| JP | 7-8848 | 2/1995 |
| JP | 7-283978 | 10/1995 |
| JP | 2624556 | 4/1997 |
| JP | 10-268399 | 10/1998 |
| JP | 11-064743 | 3/1999 |
| JP | 11-112851 | 4/1999 |
| JP | 11160775 | 6/1999 |
| JP | 11-160775 | 6/1999 |
| JP | 11-218692 | 8/1999 |
| JP | 11-248996 | 9/1999 |
| JP | 2000-147372 | 5/2000 |
| JP | 2001-281555 | 10/2001 |
| JP | 2001305629 A | * 11/2001 ........... G03B/17/02 |
| JP | 2001-311868 | 11/2001 |
| WO | 80/00377 | 3/1980 |
| WO | 99/06870 | 2/1999 |
| WO | 01/38918 | 5/2001 |
| WO | 01/52531 | 7/2001 |

OTHER PUBLICATIONS

English Language Abstract of JP–11248996.
English Language Abstract of JP 2001–311868.

(Continued)

Primary Examiner—Thong Nguyen
Assistant Examiner—Arnel C. Lavarias
(74) Attorney, Agent, or Firm—Greenblum & Bernstein, P.L.C.

(57) ABSTRACT

A binocular telescope with a photographing function includes a pair of telescopic optical systems, a casing for receiving the telescopic optical systems, and the casing has outer-side end portions. A camera system includes a photographing optical system, and a solid-state image sensor arranged behind and aligned with the photographing optical system, and an electronic control system electronically controls an operation of the camera system. The electronic control system is supplied with electric power from the batteries through an electric power source circuit board. The batteries and the electric power source circuit board are provided at the outer-side end portions of the casing, such that the weight is balanced between the outer-side end portions of the casing.

11 Claims, 8 Drawing Sheets

U.S. PATENT DOCUMENTS

| | | |
|---|---|---|
| 4,400,065 A | 8/1983 | Nagler .................. 359/788 |
| 5,235,458 A | 8/1993 | Akagi et al. ............. 359/410 |
| 5,581,399 A * | 12/1996 | Abe ..................... 359/410 |
| 5,583,692 A | 12/1996 | Funatsu ................. 359/422 |
| 5,672,862 A * | 9/1997 | Ohara et al. ............ 250/204 |
| 5,729,390 A | 3/1998 | Abe ..................... 359/661 |
| 5,742,341 A | 4/1998 | Ohishi et al. ........... 348/373 |
| 5,898,519 A * | 4/1999 | Palmer .................. 359/399 |
| 5,926,657 A | 7/1999 | Hasushita ............... 396/148 |
| 5,963,369 A | 10/1999 | Steinthal et al. ........ 359/410 |
| 6,088,053 A | 7/2000 | Hammack et al. .......... 348/61 |
| 6,255,650 B1 | 7/2001 | Warner et al. ........... 250/330 |
| 2001/0028498 A1 | 10/2001 | Haga et al. ............. 359/407 |
| 2001/0043395 A1 | 11/2001 | Costales ................ 359/464 |
| 2002/0109785 A1 | 8/2002 | Hammack et al. .......... 348/376 |
| 2003/0063383 A1 | 4/2003 | Costales ................ 359/464 |
| 2003/0227543 A1 | 12/2003 | Hammack et al. .......... 348/63 |

OTHER PUBLICATIONS

English Language Abstract of JP 11–160775.
English language Absract of JP 11–160775.
English language Abstract of JP 10–268399.
English language Abstract of JP 11–112851.
English language Abstract of JP 11–064743.
English language Abstract of JP 3–235491.
English language Abstract of JP 11–218692.
English language Abstract of JP 2000–147372.
English language Abstract of JP 3–242610.

* cited by examiner

BINOCULAR TELESCOPE WITH PHOTOGRAPHING FUNCTION

BACKGROUND OF THE INVENTION

1. Field of the Invention

The invention relates to a binocular telescope containing a camera.

2. Description of the Related Art

As is well known, a binocular telescope is used for watching sports, wild birds, and so on. When using such a binocular telescope, it is often the case that the user sees something that he or she would like to photograph. Typically, he or she will fail to photograph the desired scene because he or she must exchange a camera for the binocular telescope, and during this time the chance is lost. For this reason, a binocular telescope containing a camera is proposed, whereby a photograph can be taken immediately by using the camera contained in the binocular telescope while continuing the observation through the binocular telescope.

For example, Japanese Laid-Open Utility Model Publication (KOKAI) No. 6-2330 discloses a combination of a binocular telescope and a camera, in which the camera is simply mounted on the binocular telescope. Of course, the binocular telescope includes a pair of telescopic lens systems, and the camera includes a photographing lens system. While an object is observed through the pair of telescopic lens systems, the observed object can be photographed by the camera. This binocular telescope with the camera is bulky, and is not so easy to handle, because the camera is merely added to the binocular telescope.

Also, there is known another type of binocular telescope containing a camera, in which an objective lens system, included in one of both the telescopic lens systems, is utilized as a part of the photographing lens system.

In particular, each of the telescopic lens systems includes an objective lens system, an erecting prism system, and an ocular lens system. A half mirror is incorporated in one of the telescopic lens systems so as to be disposed between the objective lens system and the erecting lens system to define an angle of 45° with respect to the optical axis of the telescopic lens system concerned. A light beam, made incident on the objective lens system, is divided into two parts by the half mirror. Namely, a part of the light beam passes through the half mirror toward the ocular lens system, and the remaining part of the light beam is reflected by the half mirror so as to be introduced in the photographing lens system.

Due to this arrangement, this type of binocular telescope with the camera may be more compacted in comparison to the binocular telescope with the camera, as disclosed in the Publication (KOKAI) No. 6-2330. Nevertheless, it is disadvantageous in that an amount of the light beam to be made incident on the photographing lens system is diminished.

When a camera, especially, a digital camera, is combined with a binocular telescope, it is necessary to incorporate various electronic devices in the binocular telescope with the camera. Thus, batteries must be loaded in the binocular telescope with the camera before the various electronic devices can be electrically energized. In this case, it is very significant where the batteries are placed in the binocular telescope with the camera, due to a relatively large weight of the batteries.

In particular, if the binocular telescope with the camera exhibits an unbalanced weight distribution, it is difficult to stably hold the binocular telescope with the camera in a user's hands for a long time, and the user becomes susceptible to fatigue due to the unbalanced weight distribution. Also, the unbalanced weight balance results in a camera-shake. Accordingly, the location for the relatively heavy batteries should be taken into consideration, before a well-balanced weight distribution can be obtained for the binocular telescope with the camera.

SUMMARY OF THE INVENTION

Therefore, a main object of the invention is to provide a binocular telescope with a camera, having various electronic devices, in which batteries for the electronic devices are placed such that a well-balanced weight distribution can be obtained in the binocular telescope with the camera.

Another object of the invention is to provide a binocular telescope with a camera, of the aforesaid type, which is compactly constituted without unreasonable bulkiness thereof.

According to the present invention, a binocular telescope with a photographing function comprises a pair of telescopic optical systems, and a casing that receives the pair of telescopic optical systems, the casing has outer-side end portions. A camera system includes a photographing optical system, and an image sensing medium arranged behind and aligned with the photographing optical system. An electronic control system electronically controls an operation of the camera system. A battery system includes at least one battery, and an electric power source circuit board through which the electronic control system is supplied with electric power from the at least one battery. The at least one battery and the electric power source circuit board are provided at the outer-side end portions of the casing, such that a weight-balance is obtained between the outer-side end portions of the casing.

The electric power source circuit board may include an electromagnetic shielding cover. In this case, the thickness of the electromagnetic shielding cover can be adjusted such that the weight-balance is ensured between the outer-side end portions of the casing. Also, the outer-side end portion, in which the electric power source circuit board is provided, may have a counter weight so as to ensure the weight-balance between the outer-side end portions of the casing. Further, the electric power source circuit board may include an electromagnetic shielding cover, and the outer-side end portion, in which the electric power source circuit board is provided, may has a counter weight, whereby the weight-balance can be ensured between the outer-side end portions of the casing.

The casing may include two casing sections movably engaged with each other, and the respective telescopic optical systems are assembled in the casing sections such that a distance between the optical axes of the telescopic optical systems is adjustable by relatively moving one of the casing sections with respect to the remaining casing section. Preferably, one of the casing sections is slidably engaged in the remaining casing section such that the optical axes of the telescopic optical systems are movable in a common geometric plane by relatively sliding one of the casing sections with respect to the remaining casing section.

Each of the telescopic optical systems may include an optical objective system, an optical erecting system, and an optical ocular system, and both the optical erecting and ocular systems are relatively and translationally movable with respect to the optical objective system along an optical axis of the telescopic optical system, to thereby bring an object into focus. Preferably, the binocular telescope with the photographing function further comprises a manually-operable rotary shaft provided between the telescopic optical systems, and a focussing mechanism associated with the telescopic optical systems to convert a rotational movement of the manually-operable rotary shaft into a translational movement between both the optical erecting and ocular systems and the objective optical system in each telescopic optical system.

The manually-operable rotary shaft may be formed as a rotary tubular shaft, and the photographing optical system is housed in the rotary tubular shaft. Preferably, the binocular telescope with the photographing function further comprises a focussing mechanism provided between the rotary tubular shaft and the photographing optical system to convert the rotational movement of the rotary tubular shaft into a translational movement of the photographing optical system, whereby the object is brought into focus through the photographing optical system.

The image sensing medium may comprise a solid-state image sensor such that the camera system is formed as a digital camera. In this case, the translational movement of the photographing optical system is performed by the focussing mechanism to focus the object on a light-receiving surface of the solid-state image sensor.

BRIEF DESCRIPTION OF THE DRAWINGS

The objects and other objects of the invention will be better understood from the following descriptions, with reference to the accompanying drawings, in which.

DESCRIPTION OF THE PREFERRED EMBODIMENTS

Figure 1:
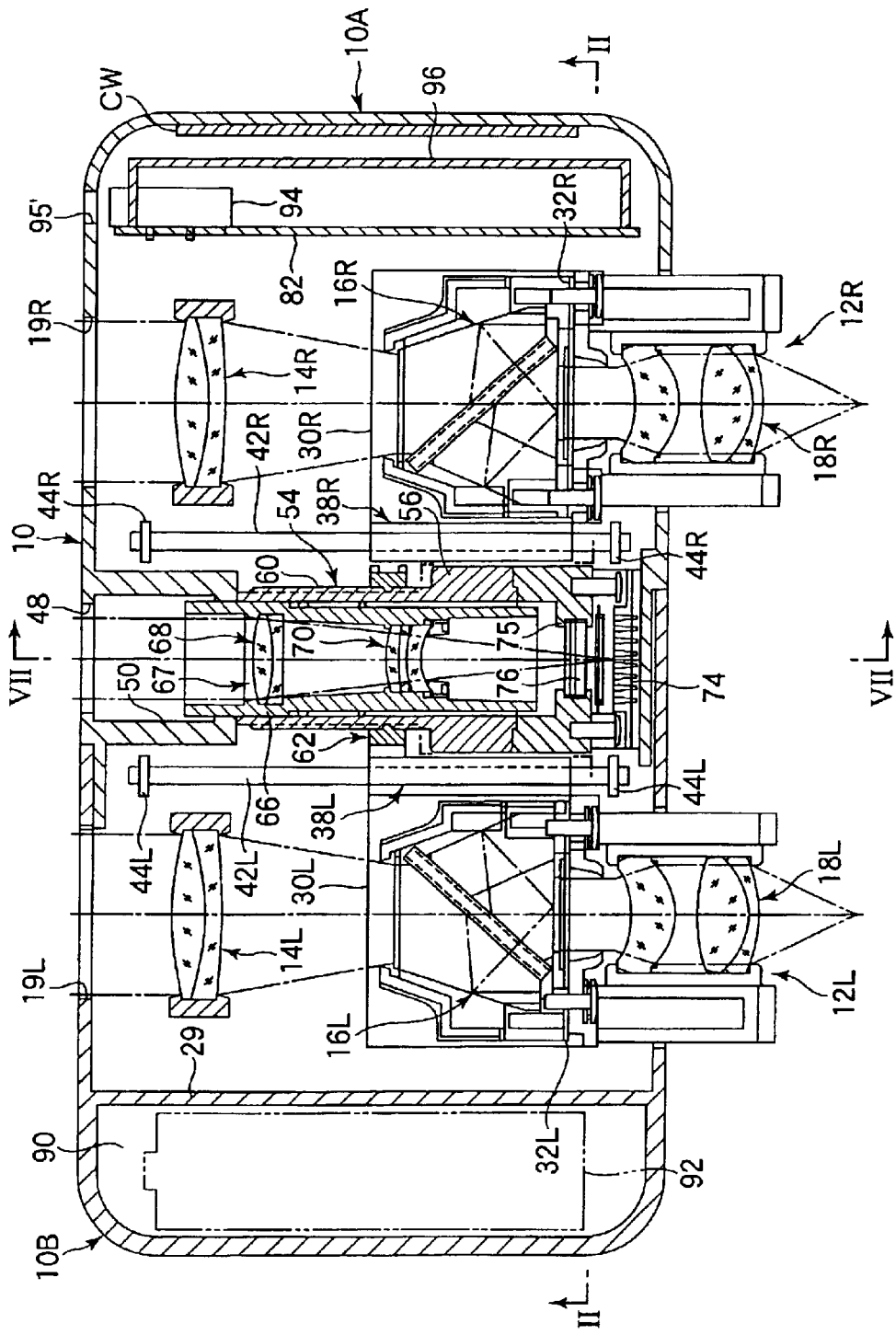
FIG. 1 is a cross-sectional plan view of a binocular telescope containing a digital camera according to the present invention.
Figure 2:
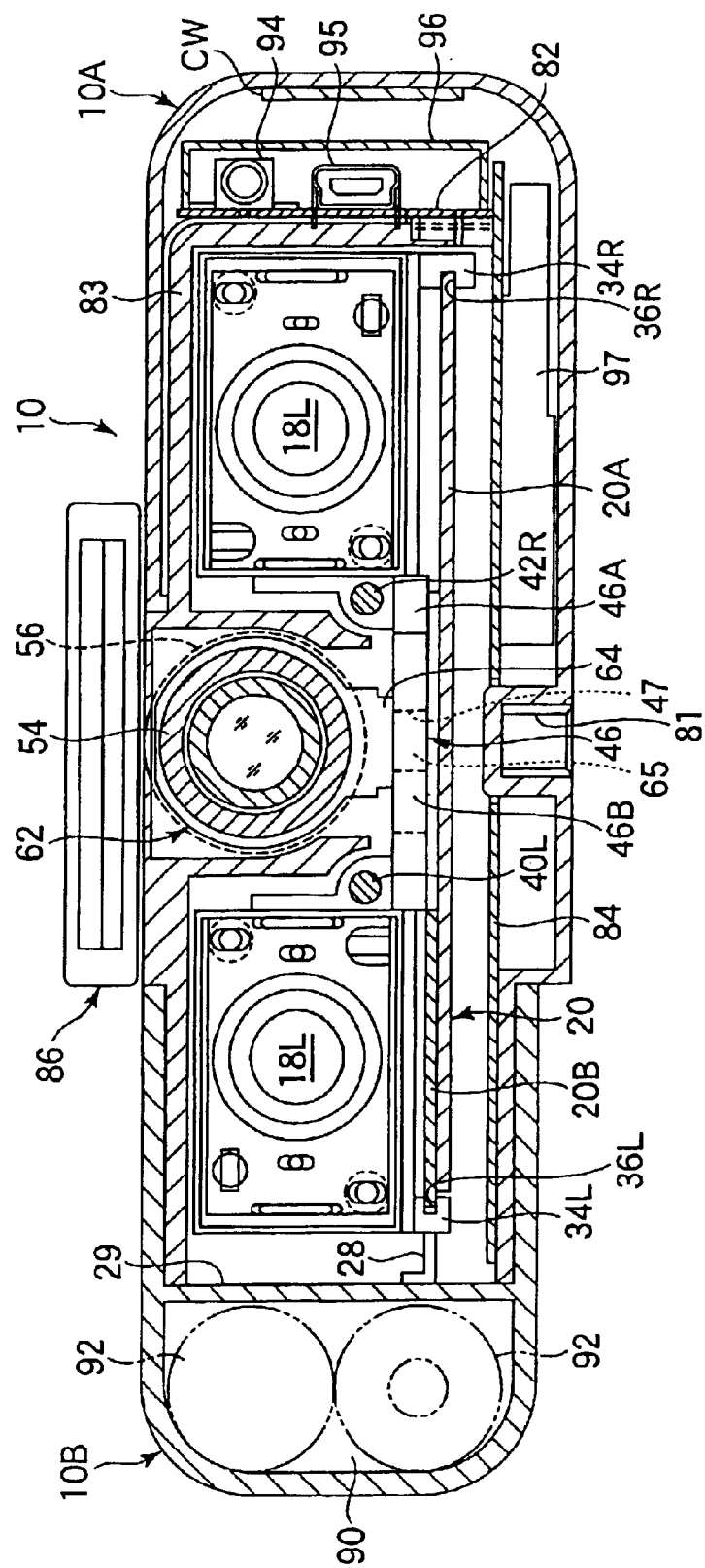
FIG. 2 is a cross-sectional view taken along line II—II of FIG. 1, in which a movable casing section is shown at a retracted position with respect to a main casing section.

FIG. 1 shows an inner arrangement of a binocular telescope containing a digital camera, constituted according to the present invention, and FIG. 2 shows a cross-section taken along line II—II of FIG. 1.

The binocular telescope with the digital camera comprises a casing 10 including a main casing section 10A and a movable casing section 10B, and a pair of telescopic lens systems 12R and 12L housed in the casing 10 and optically identical to each other. The respective telescopic lens system 12R and 12L are provided for the right and left eyes of a human, and are symmetrically arranged with respect to a middle line therebetween.

The right telescopic lens system 12R is assembled in the main casing section 10A, and includes an objective lens system 14R, an erecting prism system 16R, and an ocular lens system 18R. A front wall of the main casing section 10A is formed with a window 19R, which is aligned with the objective lens system 14R of the right telescopic lens system.

The left telescopic lens system 12R is assembled in the movable casing section 10B, and includes an objective lens system 14L, an erecting prism system 16L, and an ocular lens system 18L. A front wall of the movable casing section 10B is formed with a window 19L, which is aligned with the objective lens system 14L of the left telescopic lens system.

The movable casing section 10B is slidably engaged with the main casing section 10A, such that they are relatively moved from each other. Namely, the movable casing section 10B can be moved in relation to the main casing section 10A between a retracted position as shown in FIG. 2 and a maximum-extended position as shown in FIG. 3.

A suitable friction force acts on the sliding surfaces of both the casing sections 10A and 10B, and thus a certain extension force must be exerted on the movable casing section 10B before the movable casing section 10B can be extended from the main casing section 10A. Similarly, a certain extraction force must be exerted on the movable casing section 10B before the movable casing section 10B can be retracted onto the main casing section 10A. Thus, it is possible for the movable casing section 10B to hold or stay still at an optional position between the retracted position (FIG. 2) and the maximum-extended position (FIG. 3), due to the suitable friction force acting on the sliding surfaces of both the casing sections 10A and 10B.

Figure 3:
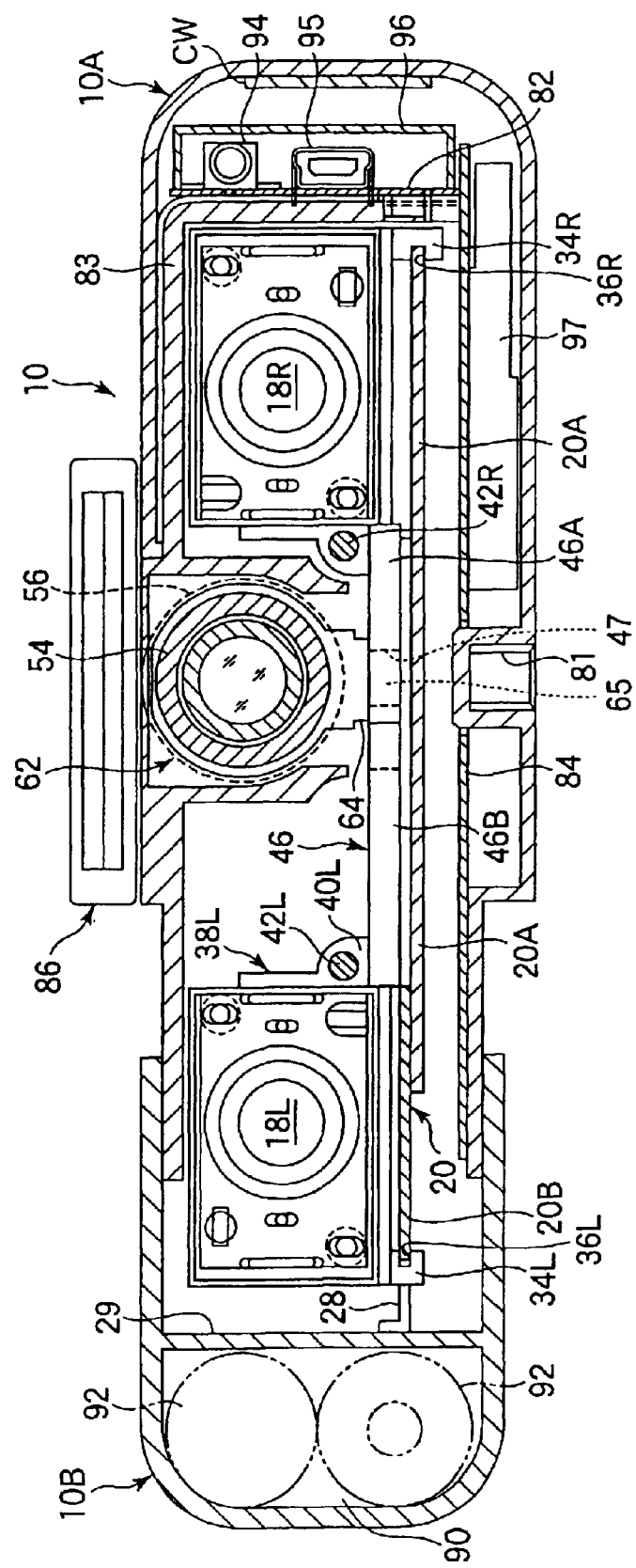
FIG. 3 is a cross-section view, similar to FIG. 2, in which the movable casing section is shown at an extended position with respect to a main casing section.

As is apparent from FIGS. 2 and 3, when the movable casing section 10B is extended from the main casing section 10A, the left telescopic lens system 12L is moved together with the movable casing section 10B, but the right telescopic lens system 12R stays in the main casing section 10A. Thus, by extending the movable casing section 10B from the main casing section 10A, it is possible to adjust a distance between the optical axes of the right and left telescopic lens systems 12R and 12L such that the distance can coincide with an interpupillary distance of a user. Namely, it is possible to perform the interpupillary adjustment by relatively sliding the movable casing section 10B in relation to the main casing section 10A.

In this embodiment, the objective lens system 14R of the right telescopic lens system 12R is housed at a fixed position with respect to the main casing section 10A, but both the erecting prism system 16R and the ocular lens system 18R are movable back and forth with respect to the objective lens system 14R, whereby an object to be observed through the right telescopic lens system 12R is brought into focus. Similarly, the objective lens system 14L of the left telescopic lens system 12L is housed at a fixed position with respect to the movable casing section 10B, but both the erecting prism system 16L and the ocular lens system 18L are movable back and forth with respect to the objective lens system 14L, whereby an object to be observed through the left telescopic lens system 12L is brought into focus.

Figure 4:
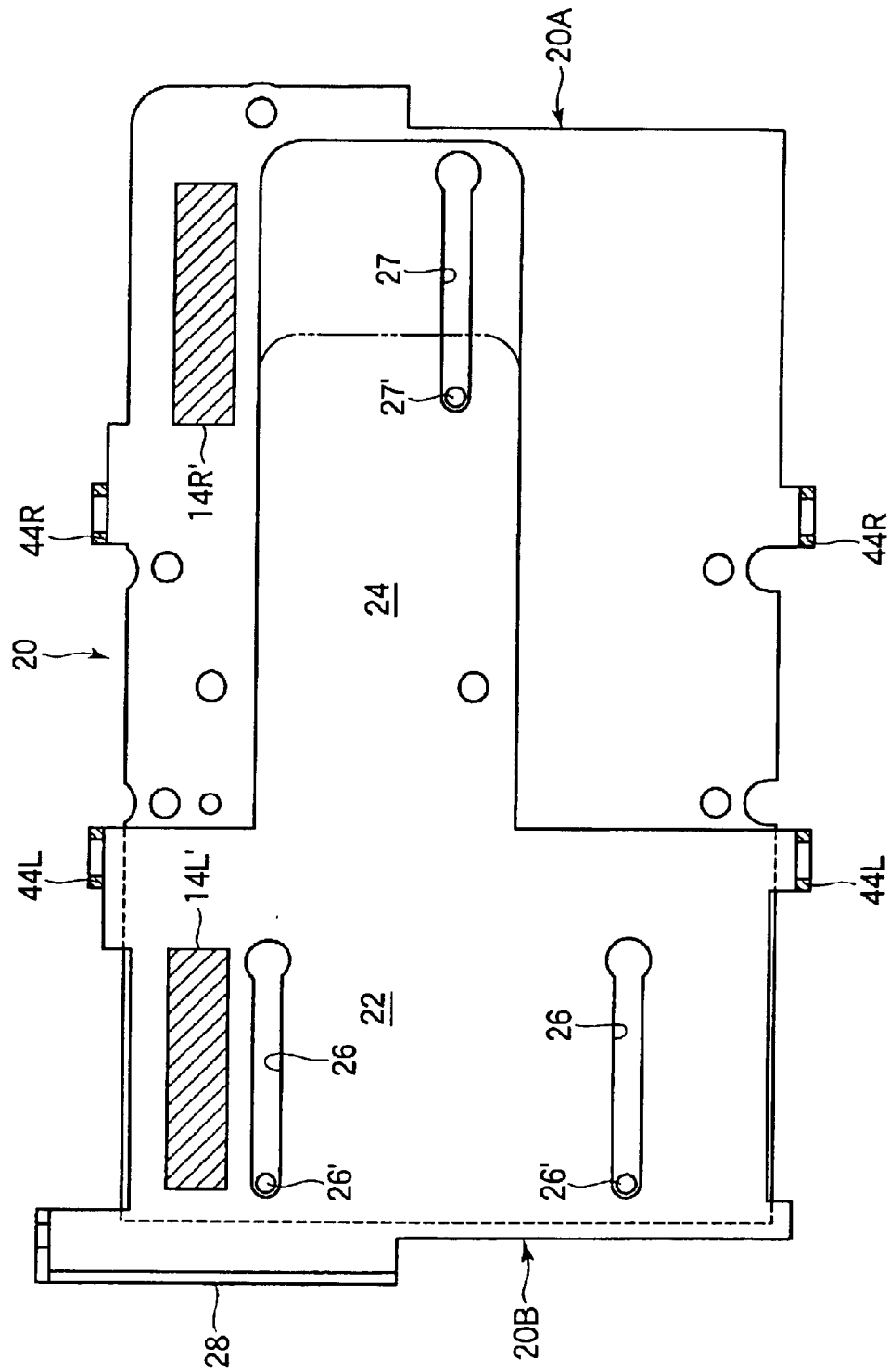
FIG. 4 is a plan view of a support-plate assembly housed in a casing formed by the main and movable casing sections.

For the purpose of both the interpupillary adjustment and the focussing of the right and left telescopic lens systems 12R and 12L, the casing 10 is provided with a support-plate assembly 20, as shown in FIG. 4, and the right and left telescopic lens systems 12R and 12L are mounted on the support-plate assembly 20 in the manner stated in detail hereinafter. Note, in FIG. 1, although the support-plate assembly 20 is visible, it is not shown in order to avoid an overly complex illustration.

As shown in FIG. 4, the support-plate assembly 20 comprises a rectangular plate member 20A, and a slide plate member 20B slidably laid on the rectangular plate member 20A. The rectangular plate member 20A has a longitudinal length, and a lateral length shorter than the longitudinal length. The slide plate member 20B includes a rectangular section 22 having a width substantially equal to the lateral length of the rectangular plate member 20A, and a section 24 integrally extended from the section 22, both the sections 22 and 24 having a longitudinal length substantially equal to the longitudinal length of the rectangular plate member 20A.

The slide plate member 20B is provided with a pair of guide slots 26 formed in the rectangular section 22, and a guide slot 27 formed in the extended section 24. On the other hand, a pair of stub elements 26' and a stub element 27' are securely attached to the rectangular plate member 20A, such that the pair of stub elements 26' is slidably received in the pair of guide slots 26, and that the stub element 27' is slidably received in the guide slot 27. The guide slots 26 and 27 are extended so as to be parallel to each other, and each slot has a length corresponding to the movement distance of the movable casing section 10B between the retracted position (FIG. 2) and the maximum-extended position (FIG. 3).

As shown in FIGS. 2 and 3, the support-plate assembly 20 is arranged in the casing 10 so as to be spaced apart from the bottom of the casing 10. Although not shown, the rectangular plate member 20A is securely connected to the main casing section 10A in a suitable manner. The slide plate member 20B has a protrusion 28 integrally protruding from rectangular section 22, and the protrusion 28 is securely connected to a partition 29 provided in the movable casing section 10B, as shown in FIGS. 2 and 3. Thus, when the movable casing section 10B is moved with respect to the main casing section 10A, the slide plate member 20B can be moved together with the movable casing section 10B.

The objective lens system 14R of the right telescopic lens system 12R is securely fixed on the rectangular plate member 20A at a hatched area indicated by reference 14R', and the objective lens system 14L of the left telescopic lens system 12L is securely fixed on the rectangular section 22 of the slide plate member 20B at a hatched area indicated by reference 14L'.

Figure 5:
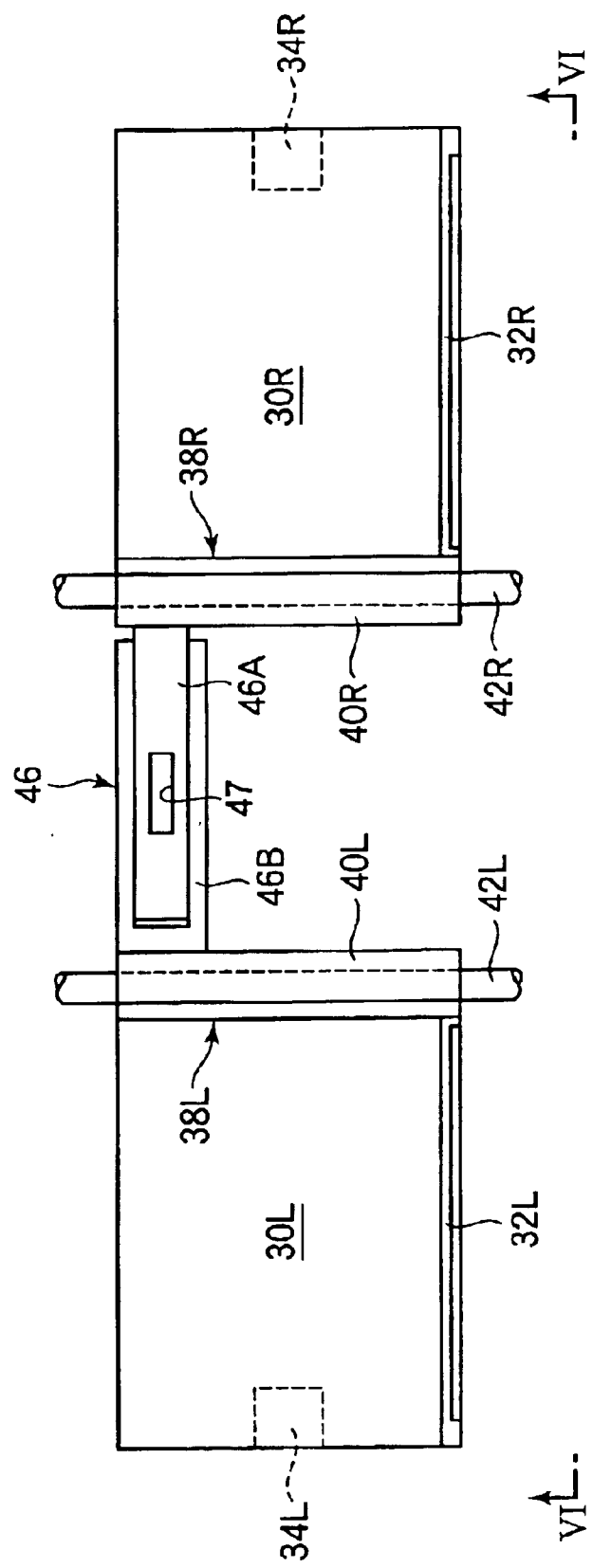
FIG. 5 is a plan view of the right and left mount plates arranged above the support-plate assembly.

FIG. 5 shows right and left mount plates 30R and 30L arranged above the support-plate assembly 20, and the respective erecting prism systems 16R and 16L are mounted on the right and left mount plates 30R and 30L, as shown in FIG. 1. Also, as is apparent from FIGS. 5 and 6, the respective right and left mount plates 30R and 30L have upright plates 32R and 32L provided along the rear side edges thereof, and the respective ocular lens systems 18R and 18L are attached to the upright plates 32R and 32L, as shown in FIG. 1.

The right mount plate 30R is movably supported by the rectangular plate member 20A such that both the erecting prism system 16R and the ocular lens system 18R are movable back and forth with respect to the objective lens system 14R. Similarly, the left mount plate 30L is movably supported by the slide plate member 20B such that both the erecting prism system 16L and the ocular lens system 18L are movable back and forth with respect to the objective lens system 14L.

Figure 6:
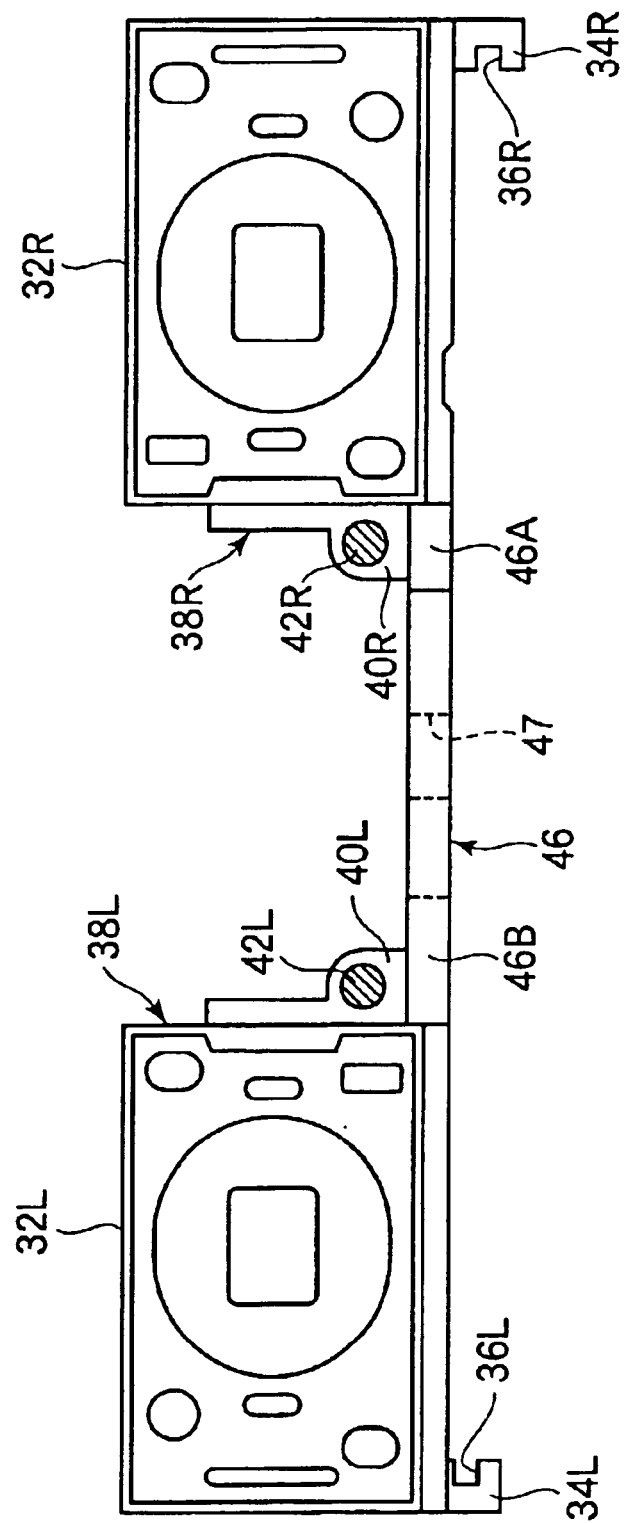
FIG. 6 is an elevational view observed along line VI—VI of FIG. 5.

In particular, the right mount plate 30R is provided with a guide shoe 34R secured to the underside thereof in the vicinity of the right side edge thereof, as shown in FIGS. 5 and 6. The guide shoe 34R is formed with a groove 36R (FIG. 6), which slidably receives a right side edge of the rectangular plate member 20A, as shown in FIGS. 2 and 3. Also, the right mount plate 30R has a side wall 38R provided along a left side edge thereof, and a lower portion of the side wall 38R is formed as a swollen portion 40R having a through bore for slidably receiving a guide rod 42R. The ends of the guide rod 42R are securely supported by a pair of fixture pieces 44R integrally protruding from the rectangular plate member 20A (FIGS. 1 and 4). Thus, the right mount plate 30R, carrying both the erecting prism system 16R and the ocular lens system 18R, are translationally movable back and forth with respect to the objective lens system 14R.

Similarly, the left mount plate 30L is provided with a guide shoe 34L secured to the underside thereof in the vicinity of the left side edge thereof, as shown in FIGS. 5 and 6. The guide shoe 34L is formed with a groove 36L (FIG. 6), which slidably receives a left side edge of the slide plate member 20B, as shown in FIGS. 2 and 3. Also, the left mount plate 30L has a side wall 38L provided along a right side edge thereof, and a lower portion of the side wall 38L is formed as a swollen portion 40L having a through bore for slidably receiving a guide rod 42L. The ends of the guide rod 42L are securely supported by a pair of fixture pieces 44L integrally protruding from the slide plate member 20B (FIGS. 1 and 4). Thus, the left mount plate 30L, carrying both the erecting prism system 16L and the ocular lens system 18L, is translationally movable back and forth with respect to the objective lens system 14L.

Note, as stated above, although the support-plate assembly 20 is not shown in FIG. 1, only the fixture pieces 44R and 44L are illustrated.

With the above-mentioned arrangement, it is possible to perform the interpupillary adjustment of the right and left telescopic lens systems 12R and 12L by moving the movable casing section 10B from and toward the main casing section 10A. Further, it is possible to perform the focussing of the right telescopic lens system 12R by translationally moving the mount plate 30R back and forth with respect to the objective lens system 14R, and it is possible to perform the focussing of the left telescopic lens system 12L by translationally moving the mount plate 30L back and forth with respect to the objective lens system 14L.

In order to simultaneously move the right and left mount plates 30R and 30L such that a distance between the right and left mount plates 30R and 30L is variable, the mount plates 30R and 30L are interconnected to each other by an expandable coupler 46.

In particular, as best shown in FIG. 5, the expandable coupler 46 includes a rectangular lumber-like member 46A, and a forked member 46B in which the lumber-like member 46A is slidably received. The lumber-like member 46A is securely attached to the underside of the swollen portion 40R of the side wall 38R at the forward end thereof, and the forked member 46B is securely attached to the underside of the swollen portion 40L of the side wall 38L at the forward end thereof. Both the members 46A and 46B have a length which is greater than the distance of movement of the movable casing section 10B, between its retracted position (FIG. 2) and its maximum extended position (FIG. 3). Namely, even though the movable casing section 10B is extended from the retracted position (FIG. 2) to the maximum extended position (FIG. 3), the slidable engagement is maintained between the members 46A and 46B. Thus, the simultaneous translational movement of both the mount plates 30R and 30L, and therefore, both the right optical system (16R, 18R) and the left optical system (16L, 18L), can be assured at all times.

Note, as best shown in FIG. 5, the lumber-like member 46A is formed with a rectangular bore 47, which is utilized for the purpose stated hereinafter.

Figure 7:
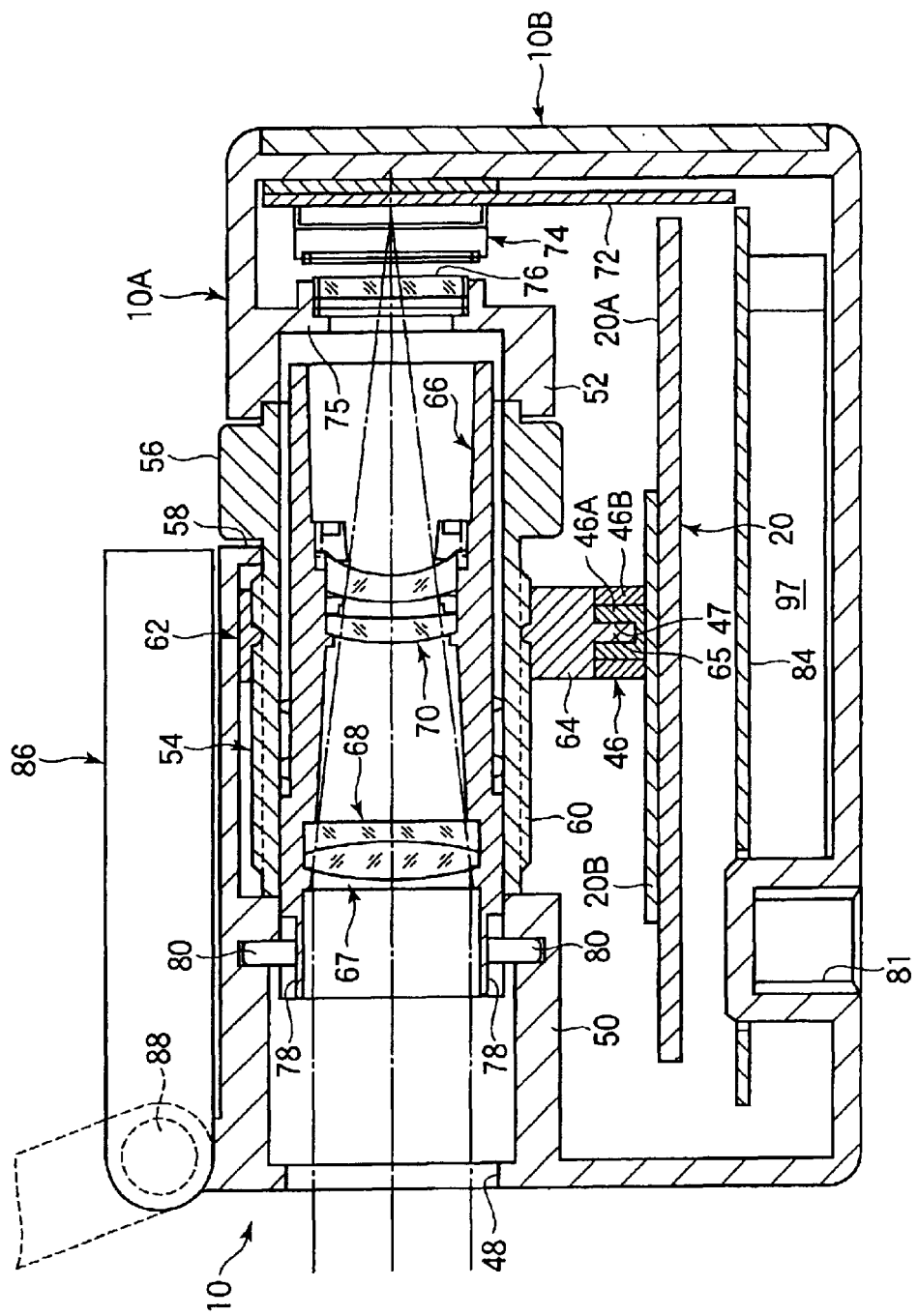
FIG. 7 is a cross-sectional view taken along line VII—VII of FIG. 1.

FIG. 7 shows a cross-section taken along line VII—VII of FIG. 1. As is apparent from FIGS. 1 and 7, the main casing section 10A has a circular window 48 formed in the front wall thereof, and the circular window 48 is at a center position of the front wall of the casing 10 when the movable casing section 10B is positioned at the retracted position (FIG. 2).

As shown in FIGS. 1 and 7, the main casing section 10A has an inner front sleeve member 50 integrally protruding from the inner wall surface of the front wall thereof to surround the circular window 48, and the inner front sleeve member 50 is integrated with the top wall of the main casing section 10A. Also, an inner rear sleeve member 52 is integrally suspended from the top wall of the main casing section 10A, and is aligned with the inner front sleeve member 50.

A tubular shaft 54 is rotatably provided between and supported by the inner front and rear sleeve members 50 and 52, and has a rotary wheel 56 integrally formed therewith. As shown in FIG. 7, a rectangular opening 58 is formed in the top wall of the main casing section 10A, a portion of the rotary wheel 56 is exposed to the outside through the rectangular opening 58. Thus, it is possible to rotate the tubular shaft 54 by manually driving the exposed portion of the rotary wheel 56 with a user's finger.

The tubular shaft 54 has a male screw 60 formed around the outer peripheral wall surface thereof between the front end thereof and the rotary wheel 56, and an annular member 62 is threaded onto the male screw 60 of the tubular shaft 54. As shown in FIGS. 2, 3, and 7, the annular member 62 has a radial extension 64 integrally formed therewith, and a rectangular projection 65 is integrally projected from the radial extension 64. The rectangular projection 65 is inserted and fitted into the rectangular bore 47 formed in the lumber-like member 46A of the expandable coupler 46.

With the above-mentioned arrangement, while the tubular shaft 54 is rotated by manually driving the rotary wheel 56, the annular member 62 is moved along the longitudinal central axis of the tubular shaft 54, resulting in the simultaneous translational movement of both the mount plates 30A and 30B, and therefore, both the right optical system (16R, 18R) and the left optical system (16L, 18L). Namely, the tubular shaft 54 and the annular member 62, which are threadedly engaged with each other, form a movement-conversion mechanism for converting the rotational movement of the rotary wheel 56 into the translational movement of both the right optical system (16R, 18R) and the left optical system (16L, 18L), and the movement-conversion mechanism is utilized as a focussing mechanism for both the right and left telescopic lens systems 12R and 12L.

Each of the right and left telescopic lens systems 12R and 12L is optically designed such that an object at infinity is brought into focus when both the erecting lens system (16R, 16L) and the ocular lens system (18R, 18L) are closest to the corresponding objective lens system (14R, 14L). Accordingly, before a near object can be brought into focus, it is necessary to move both the erecting lens system (16R, 16L) and the ocular lens system away from the corresponding objective lens system (14R, 14L). When both the erecting lens system (16R, 16L) and the ocular lens system are farthest from the corresponding objective lens system (14R, 14L), it is possible to bring a nearest object into focus.

As best shown in FIGS. 1 and 7, a lens barrel 66 is provided within the tubular shaft 54, and a photographing lens system 67 including a first lens system 68 and a second lens system 70 is held in the lens barrel 66. On the other hand, an image-sensor control circuit board 72 is securely attached to the inner wall surface of the rear wall of the main casing section 10A, and a CCD image sensor 74 is mounted on the image-sensor control circuit board 72 such that a light-receiving surface of the CCD image sensor 74 is aligned with the photographing lens system 67 held in the lens barrel 66. The inner rear sleeve member 52 has an inner annular flange 75 formed at the rear end thereof, and an optical low-pass filter 76 is fitted into the inner annular flange 75. In short, the photographing lens system 67, the CCD image sensor 74, and the optical low-pass filter 76 form a digital camera, and an object to be photographed is focussed on the light-receiving surface of the CCD image sensor 74 through the photographing lens system 67 and the optical low-pass filter 76.

In this embodiment, since the photographing lens system 67 is housed in the tubular shaft 54 having the rotary wheel 56, it is possible to compactly constitute the binocular telescope with the camera. In general, a binocular telescope needs a focussing rotary wheel, having a relatively large diameter, for focussing a pair of telescopic lens systems, and the focussing rotary wheel is mounted on a shaft. According to this embodiment, since such a shaft is formed as the tubular shaft 54 for accommodating the photographing lens system 67, it is possible to incorporate the photographing lens system in a binocular telescope without the considerable bulkiness thereof.

For example, before a nearest object, which is situated 2.0 meters ahead of the digital camera, can be photographed as a focussed image, similar to a case of a usual digital camera, it is necessary to incorporate a focussing mechanism into the photographing lens system 67. Also, preferably, the focussing mechanism for the photographing lens system 67 is operationally connected and linked to the focussing mechanism for the right and left telescopic lens systems 12R and 12L, because the telescopic lens systems 12R and 12L are utilized as a view finder system for the contained digital camera. Namely, when an object is observed as a focussed image through the right and left telescopic lens systems 12R and 12L, the observed object should be focussed on the light-receiving surface of the CCD image sensor 74 through the photographing lens system 67.

To this end, respective female and male screws are formed around the inner peripheral wall surface of the tubular shaft 54 and the outer peripheral wall surface of the lens barrel 66, such that the lens barrel 66 is in threaded-engagement with the tubular shaft 54. The front end portion of the lens barrel 66 is inserted into the inner front sleeve member 50, and a pair of key grooves 78 is diametrically formed in the front end portion of the lens barrel 66, each of the key grooves 78 extending over a predetermined distance measured from the front end edge thereof. On the other hand, a pair of bores is diametrically formed in the inner wall of the inner front sleeve member 50, and two pin elements 80 are planted in the bores in pair so as to be engaged in the key grooves 78, as shown in FIG. 7, thereby preventing a rotational movement of the lens barrel 66.

Thus, when the tubular shaft 54 is rotated by manually driving the rotary wheel 56, the lens barrel 66 is translationally moved along the optical axis of the photographing lens system 67 due to the threaded-engagement between the tubular shaft 54 and the lens barrel 66. Namely, the female and male screws, which are formed around the inner peripheral wall surface of the tubular shaft 54 and the outer peripheral wall surface of the lens barrel 66, constitute a movement-conversion mechanism for converting the rotational movement of the rotary wheel 56 into the translational movement of the lens barrel 66, and this movement-conversion mechanism is utilized as the focussing mechanism for the photographing lens system 67.

The male screw 60, formed around the outer peripheral surface of the tubular shaft 54, is formed as a reversed screw with respect to the female screw formed around the inner peripheral surface of the tubular shaft 54. Accordingly, when both the erecting prism system (16R, 16L) and the ocular lens system (18R, 18L) are moved rearward, away from the corresponding objective lens system (14R, 14L) by manually driving the rotary wheel 56, the lens barrel 66 is moved forward, away from the CCD image sensor 74. Thus, when the rearward movement of the both the erecting prism system (16R, 16L) and the ocular lens system (18R, 18L) are performed so as to bring a near object into focus in the telescopic lens system (12R, 12L), it is possible to focus the observed near object on the light-receiving surface of the CCD image sensor 74 due to the forward movement of the lens barrel 66, and therefore, the photographing lens system 67.

Note, of course, the male screw 60, formed around the outer peripheral surface of the tubular shaft 54, exhibits a screw pitch, which is determined in accordance with the optical characteristics of the right and left telescopic lens systems 12R and 12L, and the female screw, formed around the inner peripheral surface of the tubular shaft 54, exhibits a screw pitch, which is determined in accordance with the optical characteristics of the photographing lens system 67.

As shown in FIGS. 2, 3, and 7, a female-threaded bore 81 is formed in the bottom wall of the main casing section 10A, and is used to mount the binocular telescope with the digital camera on a tripod head. Namely, when the binocular telescope with the digital camera is mounted on the tripod head, the female-threaded bore 81 is threadedly engaged with a male screw of the tripod head. As is apparent from FIG. 2, when the movable casing section 10B is at the retracted position, the female-threaded bore 81 is positioned at a middle point of the retracted casing 10 and beneath the optical axis of the photographing lens system 67. Also, as is apparent from FIG. 7, the female-threaded bore 81 is contiguous with the front bottom edge of the main casing section 10A.

As shown in FIGS. 1, 2, and 3, an electric power source circuit board 82 is provided in the outer-side end portion of the main casing section 10A, and is attached to a frame structure 83 securely housed in the main casing section 10A. Also, as shown in FIGS. 2, 3, and 7, a main control circuit board 84 is provided in the main casing section 10A, and is arranged beneath the support-plate assembly 20. Although not illustrated, the main control circuit board 84 is suitably and securely supported by the bottom of the main casing section 10A. Various electronic elements, such as a microcomputer, memory circuits, and so on, are mounted on the main control circuit board 84.

In this embodiment, as is apparent from FIGS. 2, 3, and 7, an LCD (Liquid Crystal Display) panel unit 86 is arranged on the top wall of the main casing section 10A. The LCD panel unit 86 is rotatably mounted on a pivot shaft 88 which is suitably supported by the top wall of the main casing section 10A, and which extends along the top front edge thereof. The LCD panel unit 86 is usually positioned at a retracted position shown by a solid line in FIG. 7, such that the display screen of the LCD panel unit 86 is directed to the top wall surface of the main casing section 10A. Thus, when the LCD unit 86 is positioned at the retracted position, it is impossible for a user or spectator to view the display screen of the LCD unit 86. When the LCD panel unit 86 is manually rotated from the retracted position to a display position as partially shown by a broken line in FIG. 7, it is possible for the user or spectator to view the display screen of the LCD panel unit 86.

As stated above, the outer-side end portion of the movable casing section 10B is partitioned by the partition 29, thereby defining a battery chamber 90 for receiving two batteries 92 (FIGS. 1, 2 and 3). The electric power source circuit board 82 is supplied with electric power from the batteries 92 through a flexible electric power supply cord (not shown), and then the image-sensor control circuit board 72, the main control circuit board 84, the LCD panel unit 86, and so on are supplied with electric power from the electric power source circuit board 82 through flexible electric power supply cords (not shown).

As best shown in FIGS. 2 and 3, two connector terminals 94 and 95 are mounted on the electric power source circuit board 82, and are accessible from outside through two access openings formed in the front wall of the main casing section 10A. Note, in FIG. 1, only one of the two access openings, which is provided for the connector terminal 95, is indicated by reference 95'. In this embodiment, the connector terminal 94 is used as a video connector terminal for connecting the digital camera to a domestic TV set, and the connector terminal 95 is used as a USB (Universal Serial Bus) connector terminal for connecting the digital camera to a personal computer. As shown in FIGS. 1, 2, and 3, the electric power source circuit board 82 is covered together with the connector terminals 94 and 95, with an electromagnetic shielding cover 96 made of a suitable electric conductive material, such as copper, steel or the like.

When the batteries 92 are provided in the outer-side end portion of the movable casing section 10B, the weight-distribution of the casing 10, and therefore, the binocular telescope with the camera, may be unbalanced, because each battery 92 is relatively and considerably heavier than the other elements. Nevertheless, in reality, the weight-distribution of the binocular telescope with the camera may be balanced, because the electric power source circuit board 82, having a relatively large weight, is provided in the outer-side end portion of the main casing section 10A.

Also, in this embodiment, it is possible to facilitate and improve the balance of the weight-distribution of the binocular telescope with the camera, due to the additional elements, i.e. the connector terminals 94 and 95 and the electromagnetic shielding cover 96 mounted on the electric power source circuit board 82. If it is desired that the weight-distribution of the binocular telescope with the camera is to be well-balanced, the thickness of the electromagnetic shielding cover 96 may be adjusted in accordance with a total weight of the batteries 92.

Alternatively, as shown in FIGS. 1, 2, and 3, it is possible to securely attach a counter weight CW to the outer side portion of the main casing section 10A. In this embodiment, although the counter weight CW is attached to the inner wall surface of the outer end wall of the main casing section 10A, the counter weight CW may be securely mounted on the electromagnetic shielding cover 96. The counter weight CW may be formed from a suitable metal plate, such as a steel plate, a copper plate, a zinc plate, a lead plate, or the like.

As shown in FIGS. 2, 3, and 7, a suitable memory card driver, such as a CF (Compact Flash) card driver 97, is mounted on the underside of the main control circuit board 84, and is arranged in the space between the bottom wall of the main casing section 10B and the main control circuit board 84. A memory card or CF card is detachably loaded in the CF card driver 97.

Although not shown in the drawings, the binocular telescope with the digital camera is provided with various switches, such as a power ON/OFF switch, a display switch, a release switch, a selection switch and so on, and these switches are suitably arranged on the top wall of the main casing section 10.

As stated above, an object to be photographed is focussed on the light-receiving surface of the CCD image sensor 74 through the photographing lens system 67 and the optical low-pass filter 76. While the power ON/OFF switch is turned ON, the focussed object image is converted into a frame of analog image-pixel signals by the CCD image sensor 74. While the display switch is turned ON, a frame of thinned analog image-pixel signals is successively read from the CCD image sensor 74 at suitable time intervals, and the thinned analog image-pixel signals in each frame are suitably processed and converted into a frame of digital image-pixel signals. The frame of digital image-pixel signals is successively stored in a frame memory provided on the main control circuit board 84, and is read as a digital video signal from the frame memory. The digital video signal is converted into an analog video signal, and the object image is reproduced as a motion picture on the LCD panel unit 86 based on the video signal. Namely, it is possible for a user to monitor the object to be photographed on the LCD panel unit 86.

When the release switch is turned ON, a frame of full analog still image-pixel signals is read from the CCD image sensor 74 without being thinned, and is suitably processed and converted into a frame of full digital still image-pixel signals. Then, the frame of full digital still image-pixel signals is stored in the frame memory of the main control circuit board 84, and is subjected to suitable image processings. Thereafter, the processed digital still image-pixel signals for one frame are stored in the CF card memory, loaded in the CF card memory driver 97, in accordance with a given format.

When a reproduction mode is selected by operating the selection switch, the digital still image-pixel signals in each frame are thinned and read from the CF card memory of the CF card memory driver 97, and are processed to thereby produce a video signal. Then, the photographed image is reproduced as a still image on the LCD panel unit 86, based on the video signal. Optionally, the video signal may be fed to a domestic TV set through the video connector terminal 94, to reproduce the photographed image on a domestic TV set.

Also, the digital still image-pixel signals in each frame may be fed from the CF memory card to a personal computer with a printer through the UBS connector terminal 95, to thereby print the photographed image as a hard copy by using the printer. Of course, when the personal computer is provided with a CF memory card driver, the CF memory card, unloaded from the CF memory card driver 97, may be loaded in the CF memory card driver of the personal computer.

Figure 8:
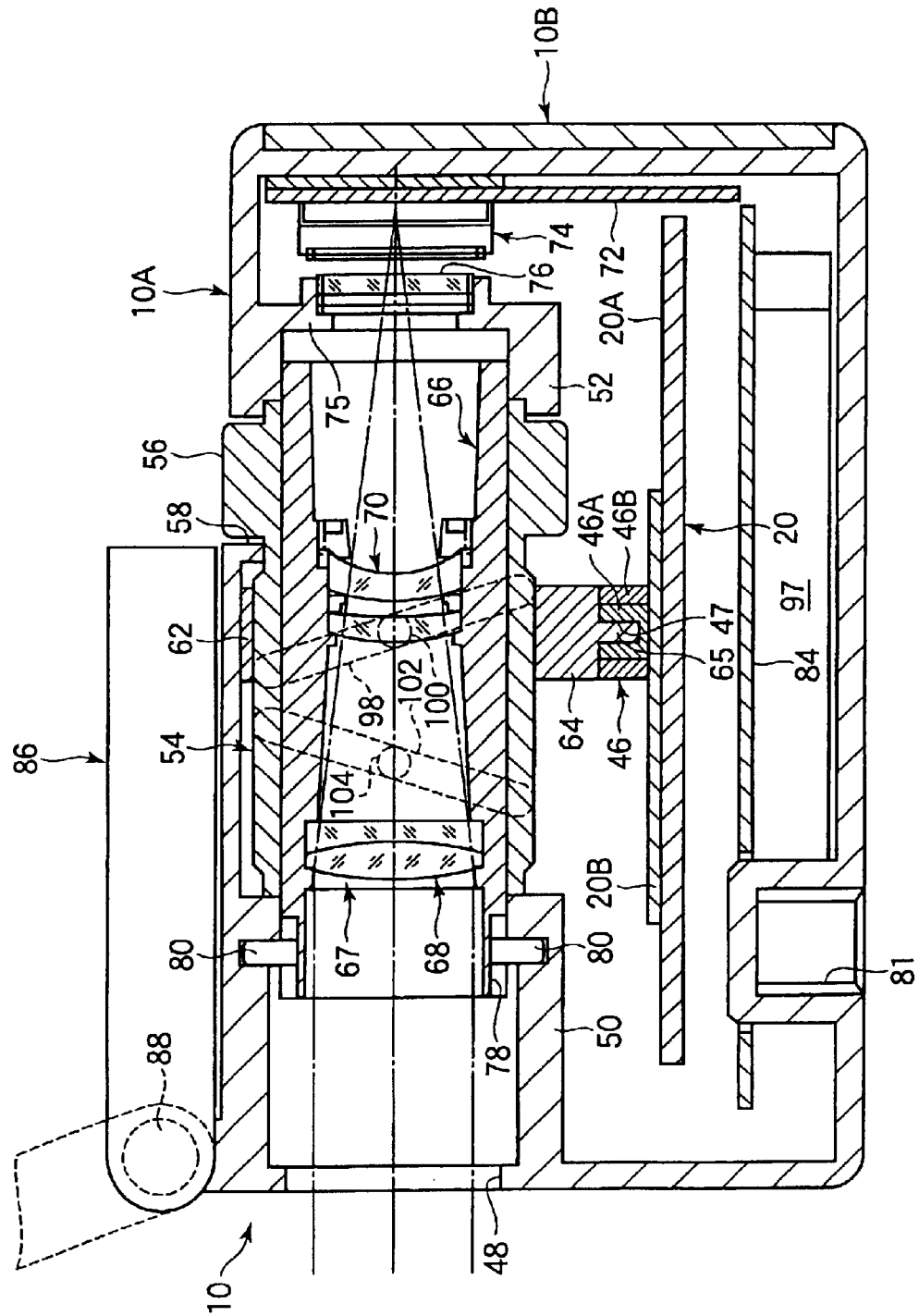
FIG. 8 is a cross-sectional view, similar to FIG. 7, showing a modification of the embodiment shown in FIGS. 1 to 7.

FIG. 8, similar to FIG. 7, shows a modification of the aforesaid embodiment of the binocular telescope containing the digital camera. Note, in FIG. 8, the features similar to those of FIG. 7 are indicated by the same references.

In the modified embodiment shown in FIG. 8, the focussing mechanism or movement-conversion mechanism for both the right and left telescopic lens systems 12R and 12L is formed by a cam groove 98 formed around the outer wall surface of the tubular shaft 54, and a stub-like cam follower 100, which protrudes from the inner wall surface of the annular member 62, and which is engaged in the cam groove 98. Note, in FIG. 8, the cam groove 98 is shown by a broken line as being developed and spread over a plane. Thus, similar to the aforesaid embodiment, the rotational movement of the rotary wheel 56 is converted into a translational movement of both the right optical system (16R, 18R) and the left optical system (16L, 18L).

Also, in the modified embodiment, the focussing mechanism or movement-conversion mechanism for the photographing lens system 67 is formed by a cam groove 102 formed around the inner wall surface of the tubular shaft 54, and a stub-like cam follower 104, which protrudes from the outer wall surface of the lens barrel 66, and which is engaged in the cam groove 102. Note, similar to the cam groove 98, the cam groove 102 is shown by a broken line as being developed and spread over a plane. Thus, similar to the aforesaid embodiment, the rotational movement of the rotary wheel 56 is converted into a translational movement of the lens barrel 66.

As is apparent from FIG. 8, the cam grooves 98 and 102 are reversely oriented with respect to each other. Accordingly, when both the erecting prism system (16R, 16L) and the ocular lens system (18R, 18L) are moved rearward away from the corresponding objective lens system (14R, 14L) by manually driving the rotary wheel 56, the lens barrel 66 is moved forward away from the CCD image sensor 74. Thus, similar to the aforesaid embodiment, when the rearward movement of the both the erecting prism system (16R, 16L) and the ocular lens systems (18R, 18L) is performed so as to bring a near object into focus in the telescopic lens system (12R, 12L), it is possible to focus the observed near object on the light-receiving surface of the CCD image sensor 74 due to the forward movement of the lens barrel 66, and therefore, the photographing lens system 67.

In the aforesaid embodiment as shown in FIGS. 1 to 7, since the focusing mechanism or movement-conversion mechanism for both the right and left telescopic lens systems 12R and 12L is formed by the male and female screws, there is a linear relationship between the rotational movement of the rotary wheel 56 and the translational movement of both the right optical system (16R, 18R) and the left optical system (16L, 18L). Similarly, since the focussing mechanism or movement-conversion mechanism for the photographing lens system 67 is formed by the male and female screws, there is a linear relationship between the rotational movement of the rotary wheel 56 and the translational movement of the photographing lens system 67.

However, in reality, there is not necessarily a linear relationship between a focussing position of both the right optical system (16R, 18R) and the left optical system (16L, 18L) and a distance measured from the focussing position of both the right and left optical systems (16R; 18R, and 16L; 18L) to both the objective lens systems 14R and 14L. Similarly, there is not necessarily a linear relationship between a focussing position of the photographing lens system 67 and a distance measured from the focussing position of the photographing lens system 67 to the light receiving surface of the CCD image sensor 74.

Thus, before both the right and left optical systems (16R; 18R, and 16L; 18L) and the photographing lens system 67 can be precisely positioned at their respective focussing positions, each of the movement-conversion mechanisms should be formed by a cam groove (98, 102) and a cam follower (100, 104) as shown in FIG. 8, because it is possible to nonlinearly move both the right and left optical systems (16R; 18R, and 16L; 18L) and the photographing lens system 67 in relation to both the objective lens system 14R and 14L and the CCD image sensor 74. In short, by using the cam grooves 98 and 102 and the cam followers 100 and 104, it is possible to precisely position both the right and left optical systems (16R; 18R, and 16L; 18L) and the photographing lens at their respective focussing positions.

Of course, since both the right and left telescopic lens systems 12R and 12L and the photographing lens system 67 have a certain amount of focal depth, there is no trouble in forming the corresponding movement-conversion mechanism by using the male and female screws. However, as an object to be focussed gets nearer to the binocular telescope with the digital camera, it is more difficult to linearly approximate the relationship between the focussing position of the optical system (16R; 18R; 16L; 18L or 67) and the corresponding distance. For example, when both the right and left telescopic lens systems 12R and 12L and the photographing lens system 67 are designed so that the nearest object, situated less than 1.0 meter ahead of the binocular telescope with the digital camera, can be focussed, it is impossible to linearly approximate a relationship between the focussing position of the optical system (16R; 18R; 16L; 18L or 67) and the corresponding distance. In this case, it is necessary to form the focussing mechanisms or movement-conversion mechanisms with the respective cam grooves 98 and 102 and the respective cam followers 100 and 104, as shown in FIG. 8.

Although the above-mentioned embodiments are directed to a binocular telescope containing a digital camera, the concept of the present invention may be embodied in another binocular telescope containing a camera using a silver halide film.

Finally, it will be understood by those skilled in the art that the foregoing descriptions are of preferred embodiments of the instrument, and that various changes and modifications may be made to the present invention without departing from the spirit and scope thereof.

The present disclosure relates to a subject matter contained in Japanese Patent Application No. 2001-302629 (filed on Sep. 28, 2001), which is expressly incorporated herein, by reference, in its entirety.

What is claimed is:

1. A binocular telescope with a photographing function, comprising:

a pair of telescopic optical systems;

a casing that receives said pair of telescopic optical systems, said casing having outer-side end portions;

a camera system including a photographing optical system, and an image sensing medium arranged behind and aligned with said photographing optical system;

an electronic control system that electronically controls an operation of said camera system; and a battery system including at least one battery, and an electric power source circuit board through which said electronic control system is supplied with electric power from said at least one battery, wherein:

said at least one battery and said electric power source circuit board are provided at respective said outer-side end portions of said casing; and said outer-side end portion in which said electric power source circuit board is provided has a counter weight so as to ensure weight balance between said outer-side end portions of said casing.

2. A binocular telescope with a photographing function as set forth in claim 1, wherein said electric power source circuit board has an electromagnetic shielding cover, and the outer-side end portion, in which said electric power source circuit board is provided, has a counter weight, whereby the weight-balance is ensured between the outer-side end portions of said casing.

3. A binocular telescope with a photographing function as set forth in claim 1, wherein said casing includes two casing sections movably engaged with each other, said respective telescopic optical systems being assembled in said casing sections such that a distance between the optical axes of said telescopic optical systems is adjustable by relatively moving one of said casing sections with respect to the remaining casing section.

4. A binocular telescope with a photographing function as set forth in claim 3, wherein one of said casing sections is slidably engaged in the remaining casing section such that the optical axes of said telescopic optical systems are movable in a common geometric plane by relatively sliding one of said casing sections with respect to the remaining casing section.

5. A binocular telescope with a photographing function as set forth in claim 1, wherein each of said telescopic optical systems includes an optical objective system, an optical erecting system, and an optical ocular system, and both said optical erecting and ocular systems are relatively and translationally movable with respect to said optical objective system along an optical axis of said telescopic optical system, to thereby bring an object into focus.

6. A binocular telescope with a photographing function as set forth in claim 5, further comprising:

a manually-operable rotary shaft provided between said telescopic optical systems; and a focussing mechanism associated with said telescopic optical systems to convert a rotational movement of said manually-operable rotary shaft into a translational movement between both said optical erecting and ocular systems and the objective optical system in each telescopic optical system.

7. A binocular telescope with a photographing function as set forth in claim 6, wherein said manually-operable rotary shaft is formed as a rotary tubular shaft, and said photographing optical system is housed in said rotary tubular shaft.

8. A binocular telescope with a photographing function as set forth in claim 7, further comprising a focussing mechanism provided between said rotary tubular shaft and said photographing optical system to convert the rotational movement of said rotary tubular shaft into a translational movement of said photographing optical system, whereby the object is brought into focus through said photographing optical system.

9. A binocular telescope with a photographing function as set forth in claim 8, wherein said image sensing medium comprises a solid-state image sensor such that said camera system is formed as a digital camera.

10. A binocular telescope with a photographing function as set forth in claim 9, wherein the translational movement of said photographing optical system is performed by the focussing mechanism to focus the object on a light-receiving surface of said solid-state image sensor.

11. A binocular telescope with a photographing function, comprising:

a pair of telescopic optical systems;

a casing that receives said pair of telescopic optical systems, said casing having outer-side end portions;

a camera system including a photographing optical system, and an image sensing medium arranged behind and aligned with said photographing optical system;

an electronic control system that electronically controls an operation of said camera system; and a battery system including at least one battery, and an electric power source circuit board through which said electronic control system is supplied with electric power from said at least one battery, wherein:

said at least one battery and said electric power source circuit board are provided at respective said outer-side end portions of said casing, such that a weight-balance is obtained between the outer-side end portions of said casing; and said electric power source circuit board has an electromagnetic shielding cover, and a thickness of said electromagnetic shielding cover is adjusted such that the weight-balance is ensured between the outer-side end portions of said casing.

* * * * *